(12) United States Patent
Aleshire et al.

(10) Patent No.: US 11,327,919 B2
(45) Date of Patent: *May 10, 2022

(54) SYSTEMS, COMPUTER-READABLE MEDIA AND COMPUTER-IMPLEMENTED METHODS FOR NETWORK ADAPTER ACTIVATION IN CONNECTION WITH FIBRE CHANNEL UPLINK MAPPING

(71) Applicant: Mastercard International Incorporated, Purchase, NY (US)

(72) Inventors: Chase A. Aleshire, O'Fallon, MO (US); Benjamin D. Williams, Pacifica, CA (US)

(73) Assignee: Mastercard International Incorporated, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/184,676

(22) Filed: Feb. 25, 2021

(65) Prior Publication Data
US 2021/0182232 A1    Jun. 17, 2021

Related U.S. Application Data

(63) Continuation of application No. 16/425,739, filed on May 29, 2019, now Pat. No. 10,963,416.

(51) Int. Cl.
*G06F 13/42* (2006.01)
*G06F 13/40* (2006.01)
(Continued)

(52) U.S. Cl.
CPC .............. *G06F 13/426* (2013.01); *G06F 8/65* (2013.01); *G06F 9/4401* (2013.01); *G06F 13/4022* (2013.01); *H04L 47/22* (2013.01)

(58) Field of Classification Search
CPC ...... G06F 13/426; G06F 13/4022; G06F 8/65; G06F 9/4401; H04L 47/22
(Continued)

(56) References Cited

U.S. PATENT DOCUMENTS 7,743,243 B2 * 6/2010 Wang ..................... G06Q 10/10
                                                          713/2
8,041,987 B2 * 10/2011 Allen ................... G06F 11/2005
                                                          714/5.11
(Continued)

*Primary Examiner* — Brian T Misiura
(74) *Attorney, Agent, or Firm* — Hovey Williams LLP

(57) ABSTRACT

A system, computer-readable media and computer-implemented method for automated network adapter activation in connection with fibre channel uplink mapping. The system includes a non-virtualized storage area network switch having a plurality of fibre channel ports. Each of the fibre channel ports is coupled to a corresponding cable to at least partly define a fibre channel uplink. The system also includes a plurality of client devices. Each client device has a network adapter. The system also includes a processing element and non-transitory computer-readable media having computer-readable instructions instructing the processing element to complete the following steps: (1) automatically execute an algorithm to determine a sequence for mapping the network adapters to respective fibre channel uplinks; (2) automatically determine a network adapter activation pattern based on the sequence to include a time delay between the network adapters; (3) automatically map the network adapters to respective fibre channel uplinks according to the sequence; and (4) automatically activate the network adapters based on the network adapter activation pattern.

20 Claims, 4 Drawing Sheets

(51) Int. Cl.
*H04L 47/22* (2022.01)
*G06F 9/4401* (2018.01)
*G06F 8/65* (2018.01)

(58) Field of Classification Search
USPC ........................................................ 710/305
See application file for complete search history.

(56) References Cited

U.S. PATENT DOCUMENTS

| | | | |
|---|---|---|---|
| 9,191,335 B2* | 11/2015 | Henry | G06F 13/4022 |
| 9,450,877 B1* | 9/2016 | Kamisetty | H04L 47/76 |
| 10,601,727 B1* | 3/2020 | Kamisetty | H04L 49/351 |
| 2007/0091903 A1* | 4/2007 | Atkinson | H04L 49/15 |
| | | | 370/401 |
| 2011/0283278 A1* | 11/2011 | Murrell | G06F 9/45558 |
| | | | 718/1 |
| 2017/0139779 A1* | 5/2017 | Yamaguchi | G06F 3/067 |

* cited by examiner

SYSTEMS, COMPUTER-READABLE MEDIA AND COMPUTER-IMPLEMENTED METHODS FOR NETWORK ADAPTER ACTIVATION IN CONNECTION WITH FIBRE CHANNEL UPLINK MAPPING

RELATED APPLICATIONS

The current patent application is a continuation patent application which claims priority benefit with regard to all common subject matter to identically titled U.S. patent application Ser. No. 16/425,739, filed May 29, 2019, which is hereby incorporated by reference in its entirety into the current patent application.

FIELD OF THE INVENTION

The present disclosure generally relates to systems, computer-readable media and computer-implemented methods for automated network adapter activation in connection with fibre channel uplink mapping.

BACKGROUND

Fibre channel networking is commonly used to provide connectivity to storage-area networks (SAN). In many configurations, fibre channel networking provides superior data transfer rates. Client devices such as blade servers may each include one or more network adapters (e.g., network interface cards or "NICs") for connecting to a fibre channel network. The fibre channel network, in turn, may provide connectivity between the client devices and the SAN, for example via a network switch cooperatively forming fibre channel uplinks to the SAN. Traffic between the fibre channel uplink and the SAN may be managed by a SAN switch. Each uplink may correspond to an uplink port of the fibre channel network switch connected to a fiber channel port of the SAN switch via fiber optic cabling.

Systems utilizing a non-virtualized SAN switch to manage traffic between the uplinks and the SAN may map client device network adapters to respective ones of the fibre channel uplinks to enable communication with the SAN. That is, an adapter in such a system may send traffic to the SAN via an uplink once mapped to that uplink. For example, the client devices may comprise eight (8) server blades on a chassis that communicate with a SAN via four (4) uplinks. In an embodiment, two (2) of the eight (8) server blades may be mapped to each uplink, though many combinations of assignments are possible.

In certain scenarios, a process for mapping the client devices to the uplinks may be initiated instantaneously for multiple client devices. For example, a system may be configured to automatically detect and begin configuration of a plurality of new server blade client devices simultaneously linked to the fibre channel network switch. For another example, where one or more uplinks become unavailable/offline, client device records storing the details of mapping between those uplinks and client devices may be reset, requiring reassignment or mapping of those client devices to one or more active uplink(s) before further traffic may be sent up to the SAN.

Client devices of existing systems may error into a read-only state during the process of mapping multiple client devices to respective fibre channel network uplinks. For example, the system may activate the network adapters of the multiple client devices simultaneously at the beginning of the mapping process, signaling to operating systems of the client devices that the connection to the fibre channel network is ready for traffic before the mapping process is actually completed. Where a client device attempts to send traffic before a corresponding network adapter has been mapped to an uplink, the client device may error into a read-only and/or timed out state, lengthening the time and effort required to enable normal operation of the system.

BRIEF SUMMARY

In a first aspect, a system for automated network adapter activation in connection with fibre channel uplink mapping may be provided. The system includes a non-virtualized storage area network switch having a plurality of fibre channel ports. Each of the fibre channel ports is coupled to a corresponding cable to at least partly define a fibre channel uplink. The system also includes a plurality of client devices. Each client device has a network adapter. The system also includes a processing element and non-transitory computer-readable media having computer-readable instructions instructing the processing element to complete the following steps: (1) automatically execute an algorithm to determine a sequence for mapping the network adapters to respective fibre channel uplinks; (2) automatically determine a network adapter activation pattern based on the sequence to include a time delay between the network adapters; (3) automatically map the network adapters to respective fibre channel uplinks according to the sequence; and (4) automatically activate the network adapters based on the network adapter activation pattern. The system may include additional, less, or alternate functionality, including that discussed elsewhere herein.

In another aspect, a computer-implemented method for automated network adapter activation in connection with fibre channel uplink mapping may be provided. The computer-implemented method includes: (1) automatically executing an algorithm to determine a sequence for mapping a plurality of network adapters to respective ones of a plurality of fibre channel uplinks, each of the plurality of network adapters corresponding to one of a plurality of client devices and each of the fibre channel uplinks being at least partly defined by one of a plurality of fibre channel ports of a non-virtualized storage area network switch coupled to a cable; (2) automatically determining a network adapter activation pattern based on the sequence to include a time delay between the network adapters; (3) automatically mapping the network adapters to respective fibre channel uplinks according to the sequence; and (4) automatically activating the network adapters based on the network adapter activation pattern. The method may include additional, less, or alternate actions, including those discussed elsewhere herein.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

DETAILED DESCRIPTION

Figure 1:
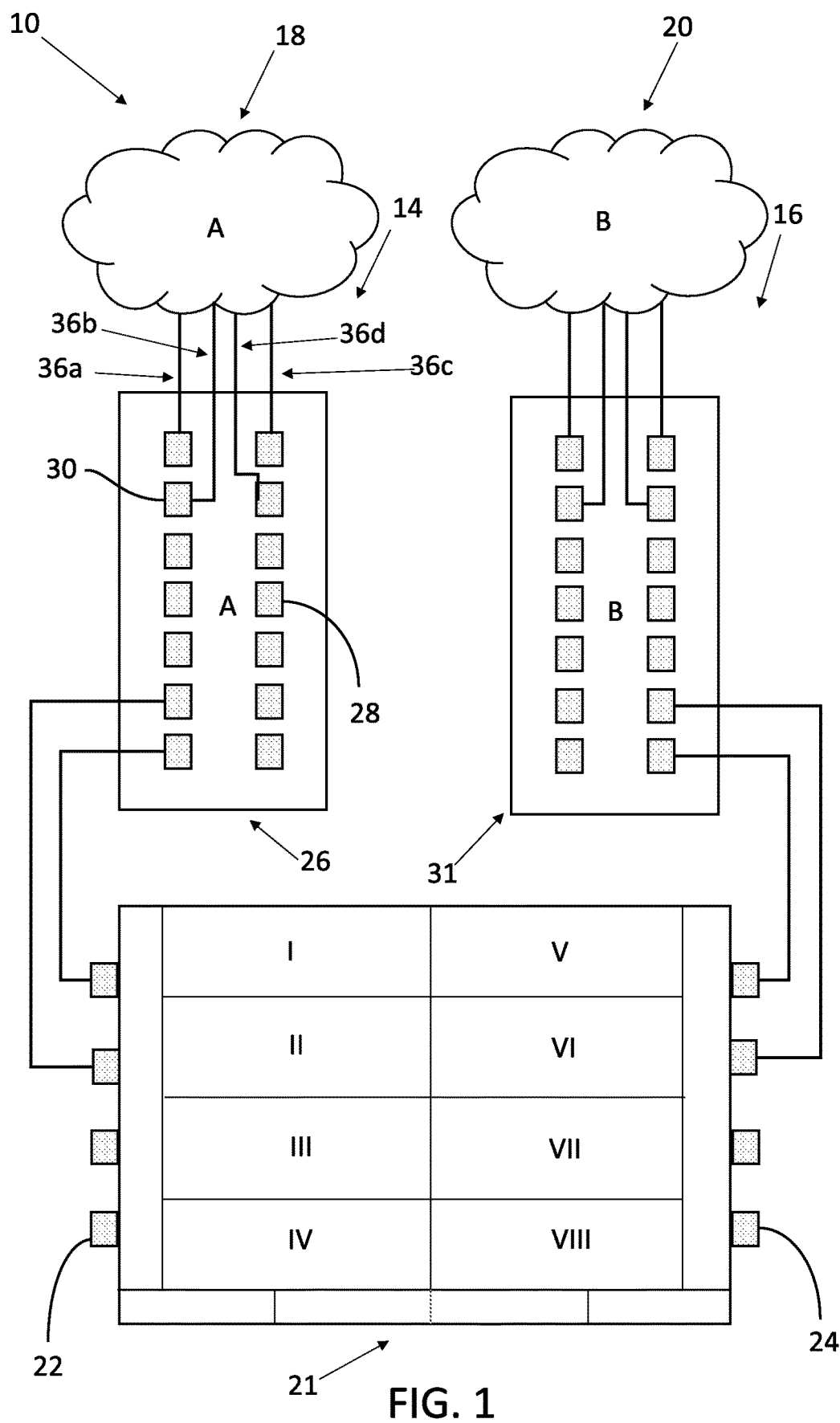
FIG. 1 illustrates an exemplary environment in which various embodiments of a controller configured for automated network adapter activation in connection with fibre channel uplink mapping may operate, the exemplary environment including resilient fibre channel networks that allow communication between client servers and SAN clouds.

Embodiments of the present technology relate to systems, computer-readable media and computer-implemented methods for automated network adapter activation in connection with fibre channel uplink mapping. Embodiments of the present technology reduce instances of errors, read-only states and/or the like among client devices seeking to exchange data with a SAN via a non-virtualized SAN switch.

According to an embodiment, a command file or script is provided that includes instructions for a processing element of a controller device to automatically determine and apply a sequence for automated network adapter activation operations in connection with fibre channel uplink mapping in a fibre channel network. The processing element of the controller may also execute a corresponding system management application for controlling aspects of the fibre channel network and/or client devices communicating via the fibre channel network.

The command file may include instructions directing the controller to automatically determine that an event of uplink unavailability has occurred. The determination may be made directly—for example where the corresponding system management application is configured for monitoring uplink status and recordation of the unavailability. The determination may also or alternatively be made indirectly—for example where the controller automatically registers a change in the status of network adapters of client devices previously sending traffic via the uplink, leading to a determination that the uplink has become unavailable. One of ordinary skill will appreciate that the determination of unavailability may be made in several ways within the scope of the present invention.

The command file may also or alternatively include instructions for determining that an automated uplink mapping process for a plurality of client devices has been initiated. For instance, the command file may include instructions for determining the execution of a routine of the corresponding system management application by the controller for mapping or assigning network adapters of the client devices to a plurality of uplinks. It is foreseen that a variety of system events may be registered to signal the progress of such a mapping process without departing from the spirit of the present invention. One of ordinary skill will also appreciate that one or both of the aforementioned uplink unavailability and uplink mapping determinations may be made within the scope of the present invention.

In an embodiment, the uplink mapping may be done in a round-robin process, for example through assignment of respective client devices in sequence (e.g., based on alphanumeric device name) to uplinks having the fewest mapped or logged-in client devices (e.g., counting among devices having completed fabric login (FLOGI), port login (PLOGI) and/or process login (PRLI) procedures with a network switch). It is foreseen that algorithms of varying complexity and nature may be included with the system management application for automated uplink mapping without departing from the spirit of the present invention. For instance, current and/or anticipated traffic through available uplinks and other factors may be considered in connection with mapping unassigned network adapters to uplinks.

The command file may also include instructions for delaying activation of the network adapters subject to the automated uplink mapping process described immediately above. In an embodiment, the command file may be primarily responsible for activating mapped network adapters. The command file may include instructions causing the controller to activate the network adapters in the sequence in which they are mapped by the automated uplink mapping process, with a pre-determined time delay between activation of each network adapter to permit completion of the uplink mapping process with respect thereto.

The command file may also or alternatively periodically determine a status of the automated uplink mapping process. The status may include a determination of anticipated uplink mapping completion timeframe with respect to one or more of the network adapters and/or identification of all or some of the network adapter sequence utilized by the uplink mapping process. Based on the determination(s), the command file may include instructions for activating the network adapters respectively at times when it is reasonably anticipated that uplink mapping has been completed, i.e., according to a network adapter activation pattern.

In an embodiment, the command file may also include instructions for countering or overriding automated mechanisms of the system management application that might interfere with the delayed activation processes, as explained in more detail below in connection with the preferred embodiments.

Embodiments of the present technology may reduce instances of errors, read-only and/or timed out states and the like among client devices seeking to exchange data with a SAN via a non-virtualized SAN switch.

Specific embodiments of the technology will now be described in connection with the attached drawing figures. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Exemplary System

FIG. 1 depicts an exemplary system 10 in which embodiments of a controller 12 (see FIG. 2) may be utilized for automated network adapter activation in connection with fibre channel uplink mapping. System 10 includes redundant A- and B-side fibre channel networks 14, 16 respectively in communication with SAN clouds 18, 20. Client devices I-VIII are racked on a chassis 21 and are respectively connected to the fibre channel networks 14, 16 via input/output (I/O) ports 22, 24 so that they may send traffic to SAN clouds 18, 20.

Generally, the client devices I-VIII may comprise computer servers such as half- or full-width blade servers, each server including at least one processing element and a memory element (in each case, not shown), as well as a transceiver element (e.g., network adapters 38, 40, which may comprise NICs). The client devices I-VIII may also comprise rack servers or other computing devices within the scope of the present invention.

In a preferred embodiment, the discussion below of the A-side fibre channel network 14 is equally applicable to the B-side fibre channel network 16, and the configurations and settings utilized thereby are symmetrical. More particularly, the B-side fibre channel network 16 may serve as a subordinate failover system in support of the primary A-side fibre channel network 14, for example where each client device I-VIII includes multi-path I/O software configured to direct SAN traffic toward the B-side fibre channel network 16 whenever the A-side fibre channel network 14 becomes unavailable. The fibre channel networks 14, 16 may be communicatively coupled—for example via respective high availability ports and Ethernet cables—for primary-to-subordinate configuration syncing.

One of ordinary skill will appreciate that the system 10 is merely exemplary, that more or fewer network elements and/or fibre channel networks/sides may be utilized, and that the system 10 may include and/or communicate with one or more local area networks (LANs), within the scope of the present invention. For instance, additional client devices (e.g., eighty-eight (88)) may be coupled to the A- and B-side fibre channel networks 14, 16—respectively for communication with SAN clouds 18, 20—in substantially the fashion outlined herein with respect to client devices I-VIII without departing from the spirit of the present invention.

Figure 3:
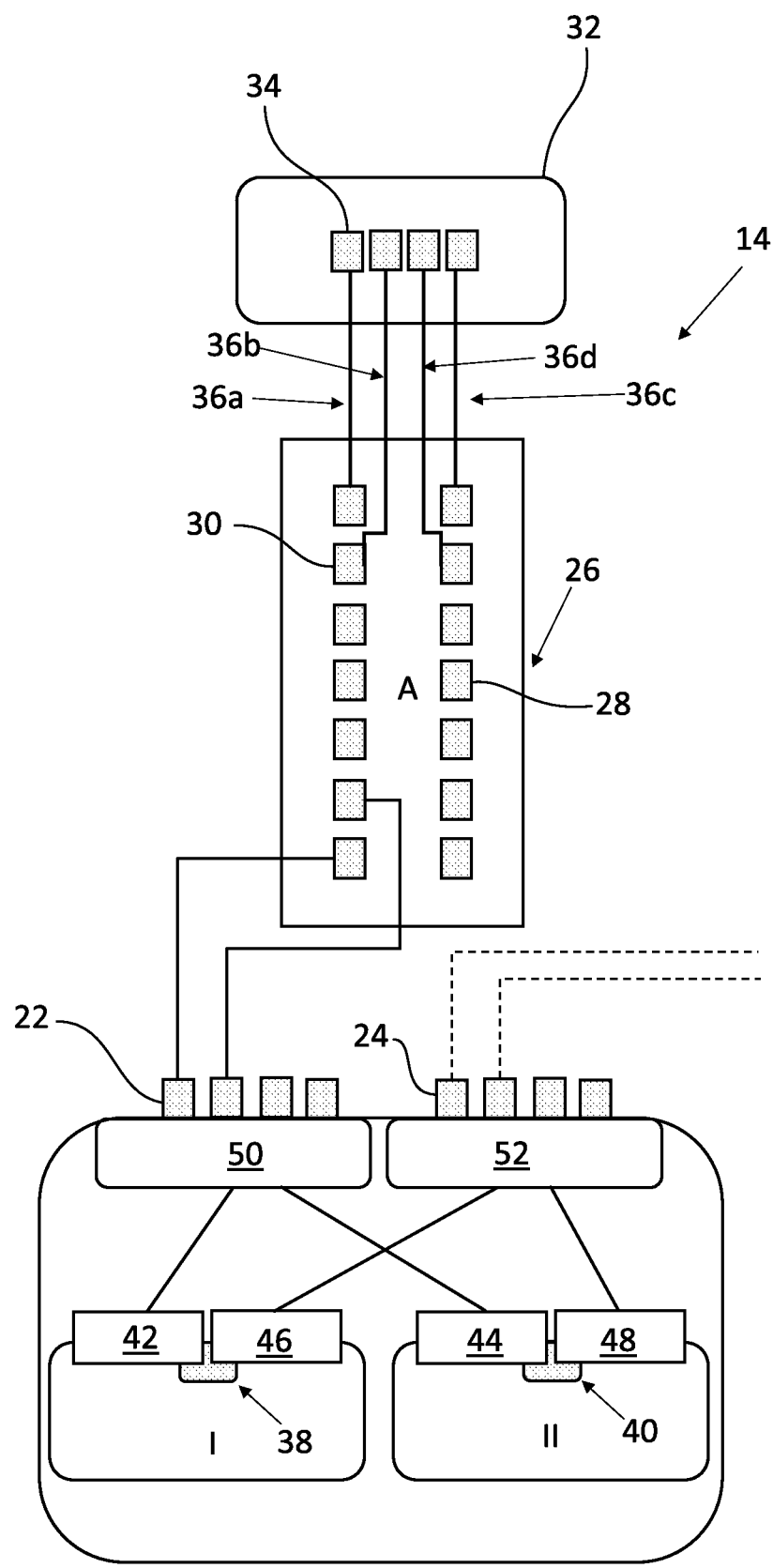
FIG. 3 illustrates a portion of the system of FIG. 1 including two exemplary client servers, an A-side fibre channel network and a SAN switch.

Turning to FIG. 3, the A-side fibre channel network 14 is illustrated in additional detail in communication with exemplary client devices I-II, it being understood that similar hardware, connectivity and configuration(s) may be employed with the remaining client devices III-VIII. The A-side fibre channel network 14 includes a network switch 26 having a plurality of ethernet ports 28 and a plurality of fibre channel ports 30. The B-side fibre channel network 16 includes an analogous network switch 31.

Cables (e.g., ethernet) communicatively couple the ethernet ports 28 to respective ones of the I/O ports 22 to carry traffic from client devices I-II to the SAN cloud 18 via A-side fibre channel network 14. The SAN cloud 18 comprises a non-virtualized SAN switch 32, which manages traffic to the SAN cloud 18. The SAN switch 32 includes fibre channel ports 34 communicatively coupled (e.g., via fiber optic cables) to respective ones of the fibre channel ports 30 to form fibre channel uplinks 36.

As used herein, "non-virtualized" SAN switches are those that operate in a configuration that does not create a single logical fibre channel link representing several physical fibre channel ports (e.g., sometimes referred to as being "port channeled"). For instance, in the preferred embodiment incorporating a CISCO UCS® system, the SAN switch 32 may operate in N_Port ID Virtualization (NPIV) mode or configuration while the network switch 26 may operate in N_Port Virtualization (NPV) mode or configuration. One of ordinary skill will appreciate that network switches that are also capable of operating in other modes and/or according to other protocols are within the scope of the present invention.

In the illustrated embodiment, client devices I-II include network adapters 38, 40. Network adapters 38, 40 respectively generate virtual host bus adapters (vHBAs) 42, 44 for managing traffic to SAN cloud 18 via A-side fibre channel network 14. Network adapters 38, 40 also respectively generate vHBAs 46, 48 for managing traffic to SAN cloud 20 via B-side fibre channel network 16. It should be noted that each of network adapters 38, 40 may be configured to generate complementary vNICs (not shown) for managing traffic with one or more LAN clouds without departing from the scope of the present invention, for example where the network adapters 38, 40 comprise dual converged network adapters. It should also be noted that the preferred embodiment includes I/O modules 50, 52 for switching traffic from the client devices I-VIII respectively to the network switches 26, 31 via I/O ports 22, 24.

Figure 2:
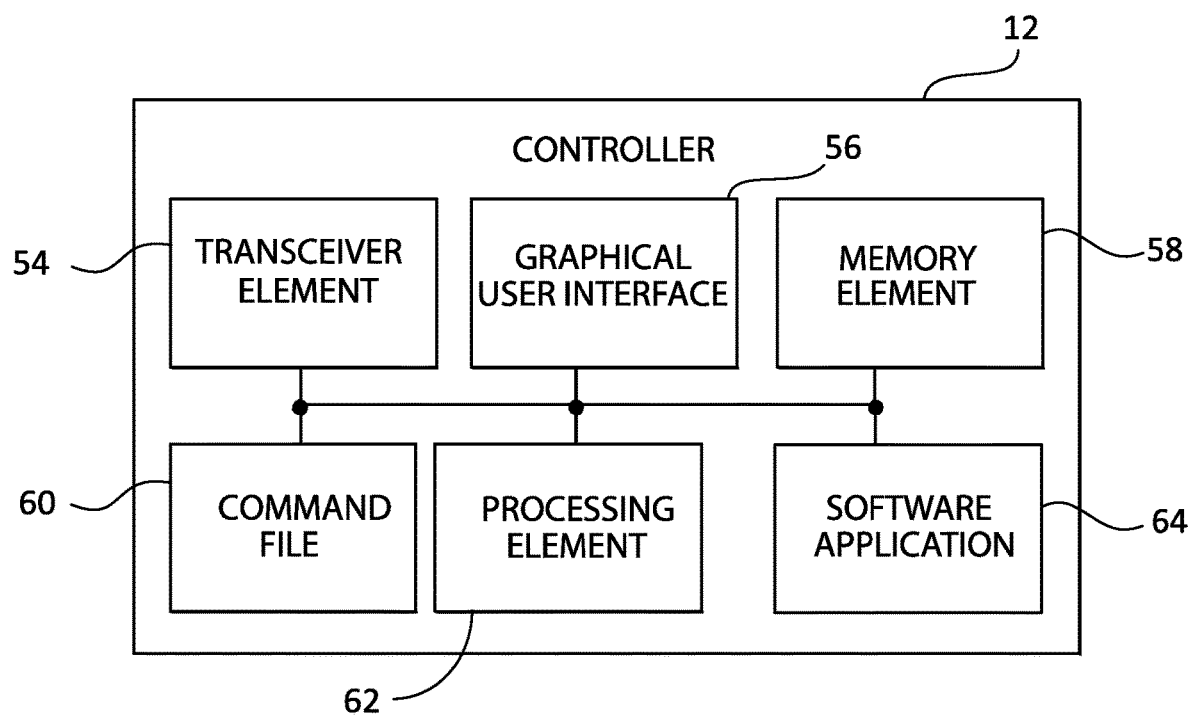
FIG. 2 illustrates various exemplary components of the controller for managing the client servers and fibre channel networks of FIG. 1, shown in block schematic form.

Turning to FIG. 2, the exemplary controller 12 includes a transceiver element 54, graphical user interface (GUI) 56, memory element 58, command file 60, processing element 62 and software application 64. The software application 64 may contribute to or comprise management software for the system 10. The software application 64 may comprise a thin client complementing a thick client executed by network switches 26, 31 without departing from the spirit of the present invention, the thin client and thick client together primarily serving as the management software for the system 10. In the exemplary embodiment, the software application 64 may include instructions that, when executed by the processing element 62 of the controller 12, centrally manage the devices and configurations of the system 10. For example, the controller 12 may control definitions of client devices I-VIII, the definitions including: resources and identity information for the device in question; firmware revision specifications; and connectivity definitions, for example through managing groupings, pinning of devices to communication paths, and other similar functions. The controller 12 may also manage configuration and firmware updates for the network adapters 38, 40 and/or firmware and operating system settings for the client devices I-II. Further, aspects of the operation of the chassis 21 may also be managed by the controller 12, such as power and/or cooling apparatus operations. The controller 12 is preferably configured to monitor and manage the status of components of the system 10. The controller 12 may communicate with the components of the system 10 via wired or wireless protocols—including by wired links with dedicated ports (not shown) of the network switches 26, 31—without departing from the spirit of the present invention.

In a preferred embodiment, the components of system 10 correspond to hardware and software configurations made available by Cisco Technology, Inc. as of the date of initial filing of this disclosure under the trademark CISCO UCS®, except that the preferred SAN switch 32 may correspond to a SAN switch made available by Brocade Communications Systems, Inc. as of the date of initial filing of this disclosure under the trademark BROCADE®.

Hardware and software configurations of CISCO UCS® are described in the following publications of Cisco Systems, Inc.—dated Aug. 14, 2018, and made available at https://www.cisco.com/c/en/us/support/servers-unified-computing/ucs-manager/products-installation-and-configuration-guides-list.html—which are hereby incorporated by reference herein in their entirety: Cisco UCS Manager Getting Started Guide, Release 4.0; Cisco UCS Manager Administration Management Guide 4.0; Cisco UCS Manager Network Management Guide, Release 4.0; Cisco UCS Manager Server Management Guide, Release 4.0; Cisco UCS Manager Storage Management Guide, Release 4.0; Cisco UCS Manager Infrastructure Management Guide, Release 4.0; Cisco UCS Manager Firmware Management Guide, Release 4.0; Cisco UCS Manager System Monitoring Guide, Release 4.0; Cisco UCS S3260 Server Integration with Cisco UCS Manager, Release 4.0; Migration Guide: Cisco UCS 6200 Series Fabric Interconnects to Cisco UCS 6454 Fabric Interconnects; Cisco UCS Manager Administration Management Using the CLI, Release 4.0; Cisco UCS Manager Network Management Guide Using the CLI, Release 4.0; Cisco UCS Manager Server Management Using the CLI, Release 4.0; Cisco UCS Manager Storage Management Guide using the CLI, Release 4.0; Cisco UCS Manager Infrastructure Management Using the CLI, Release 4.0; Cisco UCS Manager Firmware Management Using the CLI, Release 4.0; Cisco UCS Manager System Monitoring Guide Using the CLI, Release 4.0; and, Cisco UCS S3260 Server Integration with Cisco UCS Manager Using the CLI, Release 4.0.

Configurations of CISCO UCS® specific to interoperation with the BROCADE® SAN switch may be found in the aforementioned publications and/or in the following publications, which are hereby incorporated by reference herein in their entirety: Cisco UCS to Brocade Connectivity Guide, a White Paper published by Cisco Systems, Inc. in November 2018 (document identification number C07-730016-00) and made available at https://www.cisco.com/c/dam/en/us/products/collateral/servers-unified-computing/ucs-b-series-blade-servers/whitepaper_C07-730016.pdf); and Brocade SAN Interoperability with Cisco UCS, a Technical Brief published by Brocade Communications Systems, Inc. in May 2013 and made available at https://www.scribd.com/document/332437882/Cisco-UCS-to-Brocade-SAN-Interoperability. The systems and processes of the present invention are not limited to the specific embodiments described herein.

The client devices I-VIII generally retain electronic data and may respond to requests to retrieve data, as well as to store data. The client devices I-VIII may comprise and/or work in conjunction with application servers, database servers, file servers, gaming servers, mail servers, print servers, or the like, or combinations thereof. Furthermore, the client devices I-VIII may include a plurality of servers, virtual servers, or combinations thereof. The client devices I-VIII may be configured to include or execute software, such as file storage applications, database applications, email or messaging applications, web server applications or the like.

The transceiver elements described herein generally allow communication with external systems or devices. The transceiver elements may include signal or data transmitting and receiving circuits, such as antennas, amplifiers, filters, mixers, oscillators, digital signal processors (DSPs), and the like. The transceiver elements may establish communication through connectors or couplers that receive metal conductor wires or cables which are compatible with networking technologies, such as ethernet and fibre channel. In certain embodiments, the transceiver elements comprise and/or couple with optical fiber cables. The transceiver elements may be in communication with corresponding processing elements and memory elements discussed herein.

The memory elements described herein may include electronic hardware data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory elements may be embedded in, or packaged in the same package as, the processing elements. The memory elements may include, or may constitute, a "computer-readable medium." The memory elements may store the instructions, code, code segments, software, firmware, programs, applications, apps, modules, agents, services, daemons, or the like that are executed by the processing elements, including the HTTP server software. The memory elements may also store settings, data, documents, sound files, photographs, movies, images, databases, and the like, including the items described throughout this disclosure.

The processing elements described herein may include electronic hardware components such as processors. The processing elements may include microprocessors (single-core and multi-core), microcontrollers, digital signal processors (DSPs), field-programmable gate arrays (FPGAs), analog and/or digital application-specific integrated circuits (ASICs), or the like, or combinations thereof. The processing elements may generally execute, process, or run instructions, code, code segments, software, firmware, programs, applications, apps, modules, agents, processes, services, daemons, or the like, including the HTTP server software described throughout this disclosure. The processing elements may also include hardware components such as finite-state machines, sequential and combinational logic, and other electronic circuits that can perform the functions necessary for the operation of the current invention. The processing elements may be in communication with the other electronic components through serial or parallel links that include address busses, data busses, control lines, and the like.

The GUIs described herein may comprise an electronic display, such as a cathode ray tube, liquid crystal display, plasma, or touch screen that is operable to display visual graphics, images, text, etc. The GUIs can enable users to interact with electronic displays by touching or pointing at display areas—for example by moving a finger over the display and/or manipulating a peripheral device such as a mouse to move a cursor over the display—to provide information to the GUIs. In certain embodiments, the software application 64 of the present invention facilitates interaction and communication through one or more GUIs.

Through hardware, software, firmware, or combinations thereof, the processing elements may be configured or programmed to perform the functions described throughout this disclosure. In an embodiment, the software application 64 may include instructions for monitoring and managing all aspects and configurations of the system 10. For example, the software application 64 may comprise the software made available under CISCO UCS® Manager as of the date of the initial filing of this disclosure, and in such embodiments the software application 64 may be integrated with the network switches (i.e., "fabric interconnects") 26, 31. The command file 60 may be referenced by and/or included in the software application 64, and includes instructions that, when executed by the processing element 62 or one or more components of the system 10 (such as the network switch 26, which may be referred to as a "fabric interconnect" in the exemplary system), enables automated network adapter activation in connection with fibre channel uplink mapping in accordance with embodiments of the present invention. For instance, the command file 60 may comprise a script or a series of commands in a file that is capable of being executed without being compiled, such as a Perl, PHP or Python script executed by the software application 64 in connection with automated fibre channel uplink mapping.

In a preferred embodiment, normal operation of the client devices I-II may generate storage and/or retrieval requests for the SAN cloud 18. The client devices I-II may address the requests to the fibre channel network 14 by reference to respective service profile vHBAs 42, 44, which contain information for determining a path to SAN cloud 18 and otherwise define the vHBAs 42, 44. Each request may be transmitted via one of the network adapters 38, 40 to the I/O module 50 (e.g., at a backplane port of the I/O module 50), and from an I/O port 22 of the I/O module 50 to the ethernet ports 28 of the network switch 26. The network switch 26 is configured to recognize the originating client device I-II and map the corresponding request to an assigned one of the uplinks 36. The network switch 26 transmits the request to the SAN switch 32 via the assigned one of the uplinks 36 for further routing within the SAN cloud 18. It should be noted that the description above has been simplified for the purpose of illuminating the participating components of the system 10 (rather than the complexities of participating communication protocols).

Where both client devices I-II are presently assigned or mapped to a single one of the uplinks 36—for instance, uplink 36b—and uplink 36b becomes disabled, the network switch 26 reboots or otherwise causes the vHBAs 42, 44 to be unable to rely on the present mapping to uplinks 36, or the uplinks 36 otherwise become disabled/unavailable for handling traffic from the client devices I-II, the network switch 26 may be configured to re-map the vHBAs 42, 44 to available ones of the uplinks 36 to re-enable the traffic. For example, the software application 64 may include a pre-determined algorithm for determining a mapping sequence for mapping available ones of the uplinks 36 to the vHBAs 42, 44 according to the sequence, such as via a round robin process. Such re-mapping is not instantaneous in systems employing non-virtualized SAN switches, and it has been observed that premature re-enablement of the network adapters 38, 40 may lead to read-only and/or timed out states/errors on the client devices I-II, lengthening the time required for automated processes of the system 10 to bring the client devices I-II into normal operation. Embodiments of the present invention, described in more detail below, provide for automated network adapter 38, 40 activation in connection with automated mapping to fibre channel uplinks 36.

Exemplary Computer-Implemented Method

Figure 4:
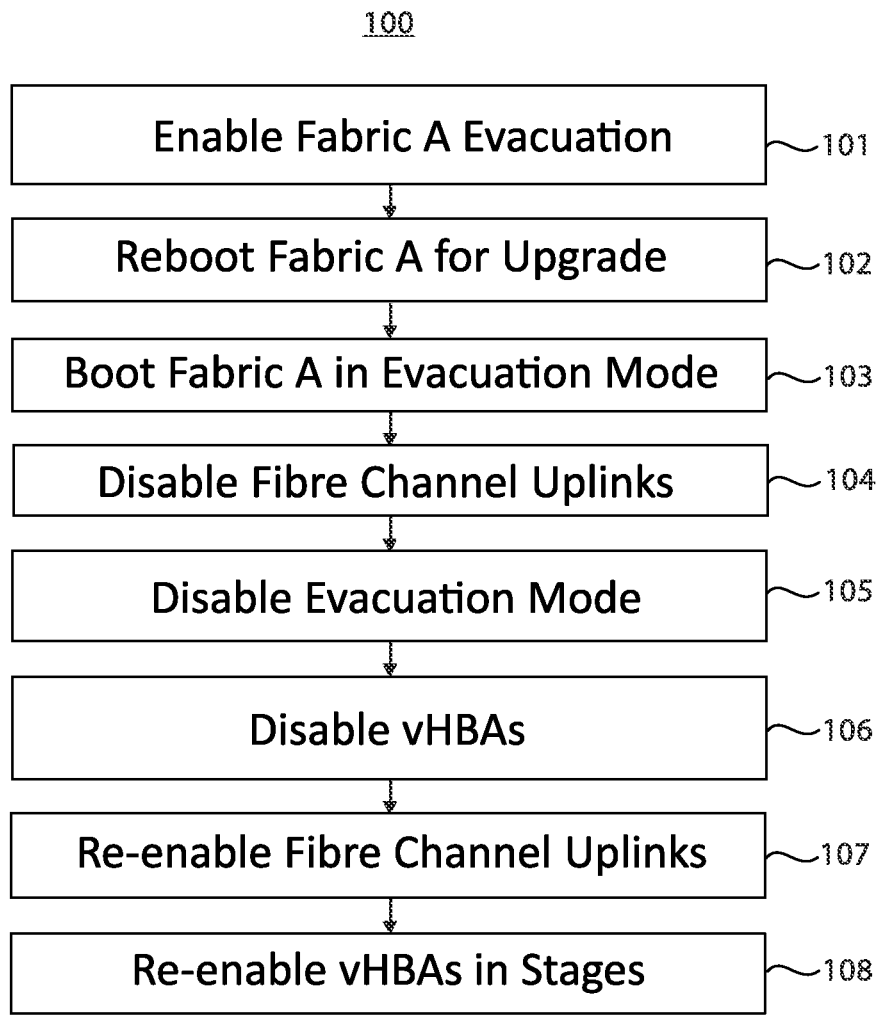
FIG. 4 illustrates at least a portion of the steps of an exemplary computer-implemented method for automated network adapter activation in connection with fibre channel uplink mapping.

FIG. 4 depicts a listing of steps of an exemplary computer-implemented method 100 for automated network adapter activation in connection with fibre channel uplink mapping. The exemplary method may be described in connection with performance of a firmware update, but a person having ordinary skill will appreciate that other known operations causing uplink unavailability—including evacuations and reboots conducted for other reasons—are within the scope of the invention. The steps may be performed in the order shown in FIG. 4, or they may be performed in a different order. Furthermore, some steps may be performed concurrently as opposed to sequentially. In addition, some steps may be optional.

The computer-implemented method 100 is described below, for ease of reference, as being executed by exemplary devices and components introduced with the embodiments illustrated in FIGS. 1-3. For example, the steps of the computer-implemented method 100 may be performed by the controller 12, the client devices I-VIII and the network switch 26 through the utilization of processors, transceivers, hardware, software, firmware, or combinations thereof. However, a person having ordinary skill will appreciate that responsibility for all or some of such actions may be distributed differently among such devices or other computing devices without departing from the spirit of the present invention. For example, the steps performed by the controller 12 may be performed in whole or in part by the network switch 26 without departing from the spirit of the present invention. For another example, the command file 60 may comprise a portion of the software application 64 within the scope of the present invention.

One or more computer-readable medium(s) may also be provided. The computer-readable medium(s) may include one or more executable programs stored thereon, such as the software application 64 and/or the command file 60, wherein the program(s) instruct one or more processing elements to perform all or certain of the steps outlined herein. For example, the command file 60 may be configured to control and/or instruct each of the steps below without departing from the spirit of the present invention. The program(s) stored on the computer-readable medium(s) may instruct the processing element(s) to perform additional, fewer, or alternative actions, including those discussed elsewhere herein.

Referring to step 101, the software application 64 may enable evacuation of network switch 26 (also referred to herein as "Fabric A"). The evacuation 101 may be triggered manually and/or automatically, and may proceed automatically substantially as outlined herein. The evacuation process may include suspending traffic through the network switch 26, causing automatic failover of the client devices I-VIII to fibre channel network 16. The software application 64 may confirm the traffic from vHBAs (e.g., vHBAs 42, 44) previously-assigned to the network switch 26 has successfully been pinned to and is flowing through the fibre channel network 16 prior to proceeding. It is foreseen that the evacuation may include more or fewer steps, may proceed in varying sequences, and may be performed substantially in accordance with the non-patent literature incorporated by reference herein, without departing from the spirit of the present invention. One of ordinary skill will also appreciate that suspending traffic through the network switch 26 may be achieved in a number of ways, both manually and automatically, within the scope of the present invention.

Referring to step 102, the software application 64 may instruct automatic rebooting of the network switch 26, for example to give effect to a firmware update to the network switch 26. Referring to step 103, the software application 64 may instruct automatic booting of the network switch 26 in an evacuation mode to test operability prior to enabling traffic through the network switch 26. It is foreseen that the reboot and boot processes outlined herein may include more or fewer steps, may proceed in varying sequences, and may be performed substantially in accordance with the non-patent literature incorporated by reference herein, without departing from the spirit of the present invention.

Referring to step 104, the software application 64 may automatically execute instructions of the command file 60 to disable the fibre channel uplinks 36. The software application 64 may instruct the controller 12 to parse components of the system 10 to identify and disable fibre channel uplinks 36 belonging to fibre channel network 14 and/or the network switch 26. This may serve to override automated system functions that would otherwise prematurely activate vHBAs 42, 44 (e.g., upon disabling evacuation mode under step 105 described below), causing read-only and/or timed out states.

It should be noted that this step 104 may be optional, for example where the system 10 does not automatically enable traffic through the network switch 26 upon disabling evacuation according to step 105 (described below) and/or where portions of the evacuation process are performed manually or not at all. It should also be noted that the fibre channel uplink disabling process outlined herein may include more or fewer steps, and may proceed in varying sequences without departing from the spirit of the present invention.

Referring to step 105, the software application 64 may instruct automatic disabling of the evacuation mode, continuing preparation of the system 10 for normal operation (e.g., following the aforementioned upgrade). Referring to step 106, the software application 64 may automatically execute instructions of the command file 60 to disable the vHBAs 42, 44 (and remaining vHBAs of the client devices III-VIII (not shown) previously-assigned to fibre channel uplinks 36). Step 106 preferably assures that any automated system functions that would otherwise prematurely activate vHBAs 42, 44 (e.g., upon disabling evacuation mode under step 105 described below) are overridden. It should be noted that this step 106 may be optional, for example where the system 10 does not automatically enable traffic through the network switch 26 upon disabling evacuation according to step 105 (described below) and/or according to other events outlined herein. It should also be noted that the vHBA-disabling process outlined herein may include more or fewer steps, and may proceed in varying sequences without departing from the spirit of the present invention.

Referring to step 107, the software application 64 may automatically execute instructions of the command file 60 to re-enable the fibre channel uplinks 36. The software application 64 may also automatically implement a pre-determined algorithm for mapping the vHBAs 42, 44 to the uplinks 36. For example, the software application 64 may be configured to order the client devices I-VIII in a sequence according to alphanumeric device name, and respectively map the A-side vHBA of each of the client devices I-VIII in round robin fashion in that sequence to an uplink of the uplinks 36 with the fewest presently-mapped client devices I-VIII. For instance, vHBA 42 may first ($1^{st}$) in the sequence, and may be mapped to uplink 36a. vHBAs for two other of the client devices I-VIII may then be mapped respectively to each of uplinks 36b-c. vHBA 44 may be fourth ($4^{th}$) in the sequence following the vHBAs mapped to uplinks 36b-c. Because only one (1) uplink 36d remains without any mapped vHBAs when vHBA 44 is reached in the round robin order, vHBA 44 may be mapped to the uplink 36d. The round robin assignment process may proceed until the A-side vHBA of each of the client devices I-VIII is mapped to one of the uplinks 36.

One of ordinary skill will appreciate that the sequence for vHBA-mapping may be determined in any non-random manner, and that the manner of determining an uplink to map each vHBA to may vary widely, within the scope of the present invention. For example, current and/or anticipated traffic originating with certain client devices and/or through available uplinks and other factors may be considered in connection with mapping unassigned vHBAs to uplinks.

It should also be noted that the uplink re-enablement and/or automated mapping processes outlined herein may include more or fewer steps, and may proceed in varying sequences without departing from the spirit of the present invention. For example, the command file 60 may also include instructions for determining that the automated uplink 36 mapping process for client devices I-VIII has been initiated.

Referring to step 108, the software application 64 may automatically execute instructions of the command file 60 to activate or re-enable the vHBAs 42, 44 in stages. The instructions of the command file 60 preferably are configured to re-enable the vHBAs 42, 44 as soon as possible after completion of the automated mapping process described above, reducing the total amount of time required to bring the client devices I-VIII and fibre channel network 14 back into normal operation while minimizing the likelihood that one or more of the client devices I-VIII will error into a read-only and/or timed out state. Activation may include changing a stored status for each vHBA 42, 44 and/or corresponding client device I-II (e.g., within a corresponding service profile) to signal the availability of and/or directly initiate A-side communication with the SAN cloud 18 via the fiber channel network 14. One of ordinary skill will appreciate that the protocol and/or method of activating and/or re-enabling the vHBAs 42, 44 may vary within the scope of the present invention.

For example, the command file 60 may be configured to instruct the software application 64 to initially and/or periodically determine, via the processing element 62 of the controller 12, at least some and preferably all of the sequence in which the A-side vHBAs of the client devices I-VIII will be mapped to uplinks 36. Where the sequence is determined according to relatively static variables known at the outset—such as by alphanumeric device name—the software application 64 may determine the sequence at the outset. In such instances, the command file 60 may be configured for determining a time for each of the vHBAs 42, 44 to be re-enabled, based on the estimated time that each will be mapped to a corresponding one of the uplinks 36. In a simple embodiment, the command file 60 may instruct calculation of a time for re-enablement based on a short time delay between each of the vHBAs, for example where it is assumed that a delay will be experienced between each mapping. Preferably, the delay between network adapter activations is more than one-tenth of a second (0.1 s). More preferably, the delay is more than one-half of one second (0.5 s). Still more preferably, the delay is between one to two seconds (1-2 s), allowing time to ensure mapping completion of each corresponding network adapter while optimizing the timeline for return to normal operation.

In another embodiment, the sequence and/or anticipated time of mapping completion for each A-side vHBA may be determined at least partly in a dynamic fashion, for example where the command file 60 includes instructions for the software application 64 to periodically determine a status of the mapping process—e.g., a rate of mapping completion for the A-side vHBAs—and to adjust time delay(s) and/or vHBA re-enablement times accordingly. One of ordinary skill will appreciate that a variety of methods may be used for increasing the accuracy of the determination of a time of mapping completion for each vHBA within the scope of the present invention. It is foreseen that the aforementioned method may be applicable to uplink mapping of any subset of client devices to a dedicated network switch uplinked to a non-virtualized SAN switch without departing from the spirit of the present invention.

An order and timing of network adapter activation outlined herein and determined based on a mapping sequence may be automatically determined, and may be referred to as a "network adapter activation pattern." The network adapter activation pattern may—alone and/or relative to one or more ascertainable system events—define the timing with which the vHBAs of network adapters undergoing automated uplink mapping are activated/re-enabled. For instance, where the uplink mapping algorithm automatically determines a sequence for network adapter mapping by ordering a simple list of alphanumeric device names corresponding to client devices, a command file may automatically require that the network adapters be re-enabled in the same sequence, with an initial two second (2 s) delay and subsequent two second (2 s) delays between each network adapter, starting concurrently with the beginning of the uplink mapping process. Therefore, based on automated determination of the uplink mapping sequence, the command file may be automatically referenced to generate the network adapter activation pattern. In other embodiments, dynamic properties and events in the system may be taken into account when determining the uplink mapping sequence and/or network adapter activation pattern without departing from the spirit of the present invention.

Embodiments of the present technology thereby reduce or eliminate instances of errors, read-only and/or timed out states and the like among client devices seeking to exchange data with a SAN via a non-virtualized SAN switch.

The method 100 may include additional, less, or alternate actions, including those discussed elsewhere in this "Detailed Description" such as in the section entitled "Exemplary System," and/or may be implemented via a computer system, communication network, one or more processors or servers, and/or computer-executable instructions stored on non-transitory storage media or computer readable medium.

Additional Considerations

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as transceiver elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A system for network adapter activation in connection with fibre channel uplink mapping, said system comprising:
    a network switch having a plurality of fibre channel ports, each of the plurality of fibre channel ports being communicatively coupled to a corresponding cable to at least partly define a fibre channel uplink;
    a plurality of client devices, each client device having a network adapter;
    a processing element; and
    non-transitory computer-readable media having computer-readable instructions instructing the processing element to complete the following steps
        map the network adapters to respective fibre channel uplinks in a sequence, prior to activating the network adapters
        enable a traffic evacuation of the network switch,
        disable the fibre channel uplinks,
        disable the traffic evacuation of the network switch,
        re-enable the fibre channel uplinks,
        activate the network adapters in accordance with the sequence.

2. The system of claim 1, wherein the network switch further comprises the processing element and the non-transitory computer-readable media.

3. The system of claim 1, further comprising a controller including the processing element and the non-transitory computer-readable media, the controller being communicatively coupled to the network switch.

4. The system of claim 1, wherein the computer-readable instructions are configured to perform a firmware upgrade prior to disabling the traffic evacuation of the network switch.

5. The system of claim 4, wherein the computer-readable instructions are configured to reboot the network switch prior to disabling the fibre channel uplinks.

6. The system of claim 1, further comprising a non-virtualized storage area network switch including a plurality of fibre channel ports respectively communicatively coupled to the fibre channel ports of the network switch to at least partly define the fibre channel uplinks.

7. The system of claim 6, wherein the storage area network switch in N_Port ID Virtualization Mode exchanges data with the network switch in N_Port Virtualization Mode.

8. The system of claim 1, wherein the computer-readable instructions instruct the processing element to complete the following further steps
    determine a network adapter activation pattern based on the sequence to include a time delay between the network adapters,
    the network adapters being activated based on the network adapter activation pattern.

9. The system of claim 8, wherein the computer-readable instructions are configured to reference a command file for completion of the determination of the network adapter activation pattern and the activation of the network adapters based on the network adapter activation pattern.

10. The system of claim 1, wherein each of the plurality of client devices comprises a blade server.

11. A computer-implemented method for network adapter activation in connection with fibre channel uplink mapping, the computer-implemented method comprising:
    mapping a plurality of network adapters to respective fibre channel uplinks in a sequence, wherein each of the plurality of network adapters corresponds to one of a plurality of client devices and each of the fibre channel uplinks is at least partly defined by one of a plurality of fibre channel ports of a network switch communicatively coupled to a corresponding cable,
    prior to activating the network adapters
        enabling a traffic evacuation of the network switch,
        disabling the fibre channel uplinks,
        disabling the traffic evacuation of the network switch,
        re-enabling the fibre channel uplinks,
    activating the network adapters in accordance with the sequence.

12. The computer-implemented method of claim 11, wherein the network switch further comprises a processing element and non-transitory computer-readable media having computer-readable instructions instructing the processing element to complete the mapping and activating steps.

13. The computer-implemented method of claim 11, wherein the mapping and activating steps are completed according to computer-readable instructions stored on non-transitory computer-readable media of a controller and executed by a processing element of the controller, the controller being communicatively coupled to the network switch.

14. The computer-implemented method of claim 11, further comprising performing a firmware upgrade prior to disabling the traffic evacuation of the network switch.

15. The computer-implemented method of claim 14, further comprising rebooting the network switch prior to disabling the fibre channel uplinks.

16. The computer-implemented method of claim 11, wherein each of the plurality of fibre channel uplinks is partly defined by one of a plurality of corresponding fibre channel ports of a non-virtualized storage area network switch, the plurality of fibre channel ports of the storage area network switch being respectively communicatively coupled to the plurality of fibre channel ports of the network switch.

17. The computer-implemented method of claim 16, wherein the storage area network switch in N_Port ID Virtualization Mode exchanges data with the network switch in N_Port Virtualization Mode.

18. The computer-implemented method of claim 11, further comprising determining a network adapter activation pattern based on the sequence to include a time delay between the network adapters, the network adapters being activated based on the network adapter activation pattern.

19. The computer-implemented method of claim 18, wherein a command file is referenced for completion of the determination of the network adapter activation pattern and the activation of the network adapters based on the network adapter activation pattern.

20. The computer-implemented method of claim 11, wherein each of the plurality of client devices comprises a blade server.

* * * * *